(12) United States Patent
Healy et al.

(10) Patent No.: US 7,639,630 B2
(45) Date of Patent: Dec. 29, 2009

(54) NETWORK PERFORMANCE MANAGEMENT

(75) Inventors: Desmond Healy, Hennef (DE); Stefan Schornstein, Aachen (DE); Rolf Hausammann, Zurich (CH)

(73) Assignee: Accenture Global Services GmbH (CH)

( * ) Notice: Subject to any disclaimer, the term of this patent is extended or adjusted under 35 U.S.C. 154(b) by 405 days.

(21) Appl. No.: 11/557,078

(22) Filed: Nov. 6, 2006

(65) Prior Publication Data
US 2007/0195695 A1 Aug. 23, 2007

(30) Foreign Application Priority Data
Nov. 7, 2005 (EP) .................. 05024234

(51) Int. Cl.
G06F 11/00 (2006.01)
H04L 12/56 (2006.01)
G06F 15/173 (2006.01)

(52) U.S. Cl. .................. 370/252; 370/395.21; 709/224

(58) Field of Classification Search ................ 370/230, 370/244, 252, 395.21; 718/104
See application file for complete search history.

(56) References Cited

U.S. PATENT DOCUMENTS

| | | | |
|---|---|---|---|
| 5,751,914 A * | 5/1998 | Coley et al. ................ 706/47 |
| 5,761,502 A * | 6/1998 | Jacobs .................... 707/103 R |
| 5,958,009 A * | 9/1999 | Friedrich et al. ............ 709/224 |
| 6,216,154 B1 * | 4/2001 | Altschuler et al. .......... 709/203 |
| 6,556,659 B1 * | 4/2003 | Bowman-Amuah ........ 379/9.04 |
| 6,650,644 B1 * | 11/2003 | Colley et al. ........... 370/395.21 |
| 6,766,368 B1 * | 7/2004 | Jakobson et al. ............ 709/224 |
| 6,801,940 B1 * | 10/2004 | Moran et al. ............... 709/224 |
| 7,058,704 B1 * | 6/2006 | Mangipudi et al. .......... 709/223 |
| 7,107,187 B1 * | 9/2006 | Saghier et al. .............. 702/186 |
| 7,142,516 B2 * | 11/2006 | Lev et al. ................... 370/244 |
| 7,275,250 B1 * | 9/2007 | Novik et al. ................ 719/318 |

(Continued)

OTHER PUBLICATIONS

Liberal, F., et al., "Application of general perception-based QoS model to find providers' responsibilities. Case study: user perceived Web service performance" Proceedings of the 2005 Joint International Conference on Autonomic and Autonomous Systems and International Conference on Networking and Services (ICAS/ICNS 2005), Papeete, Tahiti, French Polynesia, Oct. 23, 2005-Oct. 28, 2005, pp. 1-6, ISBN: 0-7695-2725-6.

(Continued)

Primary Examiner—Chi H Pham
Assistant Examiner—Warner Wong
(74) Attorney, Agent, or Firm—Fish & Richardson P.C.

(57) ABSTRACT

The performance of a network can be managed by receiving a set of key quality parameters, wherein a key quality parameter represents a characteristic associated with at least one network component; identifying a service quality mapping module based on one or more network components associated with providing an end customer service, wherein the service quality mapping module corresponds to at least one service instance and defines a correlation between the set of key quality parameters and a set of customer quality parameters; applying the service quality mapping module to the set of key quality parameters to generate the set of customer quality parameters; and outputting a signal representing at least one customer quality parameter included in the set of customer quality parameters. Further, the service quality mapping module can define a linear dependency between a customer quality parameter and at least one key quality parameter.

33 Claims, 9 Drawing Sheets

U.S. PATENT DOCUMENTS

| | | | |
|---|---|---|---|
| 7,330,832 B1* | 2/2008 | Gray et al. ..................... 705/37 |
| 7,463,634 B1* | 12/2008 | Hansen ................... 370/395.2 |
| 7,472,397 B2* | 12/2008 | Hunsinger et al. .......... 719/318 |
| 2005/0152353 A1* | 7/2005 | Couturier .................... 370/389 |
| 2006/0268731 A1* | 11/2006 | Moore ........................ 370/252 |
| 2007/0030815 A1* | 2/2007 | Beerends et al. ............ 370/252 |
| 2007/0076605 A1* | 4/2007 | Cidon et al. ................. 370/230 |
| 2007/0083631 A1* | 4/2007 | Maccaux .................... 709/223 |

OTHER PUBLICATIONS

"Communications quality of service: A framework and definitions" ITU-T G.1000, Nov. 2001, XP017400619.

* cited by examiner

NETWORK PERFORMANCE MANAGEMENT

This application claims the benefit of a foreign application filed with the European Patent Convention, serial number 05024234.6, filed Nov. 7, 2005. The disclosure of the prior application is considered part of (and is incorporated by reference in) the disclosure of this application.

BACKGROUND

The present disclosure relates to controlling and managing network performance, for example, the performance of networks provided by telecommunications companies (such as cellular phone networks) and/or internet service providers.

Today, service quality is seen as an important aspect within the telecommunications industry. To be successful in that area it is important to greatly enhance the service quality perceived by the customer. Therefore the quality as perceived by the customer needs to be measured and managed. Up until now the quality perceived by the customer could not be measured easily, if at all. Nowadays, only technical key performance indicators (KPIs) typically are measured that are not linked to the quality perceived by the customer. Investments are made on a "best effort" basis, which tends to lead to over-investment in certain parts of the production platform and under-investment in others.

SUMMARY

The present disclosure provides a method, a computer program product, and a system for controlling and managing a network in order to facilitate reliable and flexible network management to improve the service quality perceived by a customer.

The present inventors recognized the need to measure and manage the network performance experienced by a customer in addition to permitting the measurement and management of pure network performance. The need also was recognized to permit monitoring and managing a service delivery chain, such as an end-to-end service delivery chain. The present inventors further recognized the need to permit monitoring and managing performance data correlated with customer perception in addition to allowing the monitoring and management of individual performance indicators. Additionally, the need was recognized to provide a real view of the quality delivered to an end customer. Further, the need was recognized to permit monitoring the performance of a network and/or one or more triggering actions in conjunction with controlling network performance.

In general, in one aspect, the techniques can be implemented to include receiving a set of key quality parameters, wherein a key quality parameter represents a characteristic associated with at least one network component; identifying a service quality mapping module based on one or more network components associated with providing an end customer service, wherein the service quality mapping module corresponds to at least one service instance and defines a correlation between the set of key quality parameters and a set of customer quality parameters; applying the service quality mapping module to the set of key quality parameters to generate the set of customer quality parameters; and outputting a signal representing at least one customer quality parameter included in the set of customer quality parameters.

The techniques also can be implemented such that the service quality mapping module defines a linear dependency between a customer quality parameter and at least one key quality parameter. Further, the techniques can be implemented such that the linear dependency between the customer quality parameter and the at least one key quality parameter includes one or more weighting factors. Additionally, the techniques can be implemented such that the service quality mapping module further comprises a set of service quality parameters, wherein at least one service quality parameter is included for each network component involved in providing the end customer service; a first correlation function defining a correlation between the set of key quality parameters and the set of service quality parameters; and a second correlation function defining a correlation between the set of service quality parameters and the set of customer quality parameters.

The techniques also can be implemented such that at least one of the first correlation function and the second correlation function includes one or more weighting factors. The techniques further can be implemented to include defining a correlation set corresponding to a customer quality parameter included in the set of customer quality parameters, wherein the correlation set comprises the customer quality parameter and each key quality parameter and service quality parameter correlated with the customer quality parameter; identifying one or more responsibility pools associated with at least one service quality parameter, key quality parameter, or customer quality parameter included in the correlation set; and outputting a signal representing the customer quality parameter corresponding to the correlation set to one or more departments associated with the one or more identified responsibility pools. Additionally, the techniques can be implemented to include retrieving service level agreement data from an end customer database, wherein the service level agreement data includes any combination of one or more predetermined key quality parameters, one or more predetermined service quality parameters, and one or more predetermined customer quality parameters; determining a deviation between the retrieved service level agreement data and one or more corresponding parameters included in any of the set of key quality parameters, the set of service quality parameters, and the set of customer quality parameters; and outputting a signal indicating the determined deviation. Further, the techniques can be implemented to include outputting the signal to a department responsible for at least one key quality parameter, service quality parameter, or customer quality parameter that deviates from the retrieved service level agreement data.

The techniques also can be implemented such that the set of customer quality parameters indicates at least one aspect of a service quality perceived by an end customer. The techniques further can be implemented such that the service quality mapping module comprises a plurality of instance quality mapping modules, each instance quality mapping module corresponding to a service instance. Additionally, the techniques can be implemented such that applying the service quality mapping module further comprises applying at least one of the plurality of instance quality mapping modules to one or more key quality parameters included in the set of key quality parameters to generate one or more customer quality parameters associated with the corresponding service instance.

The techniques also can be implemented such that receiving the set of key quality parameters further comprises receiving one or more trigger signals, wherein a trigger signal represents a characteristic associated with at least one network component and generating the set of key quality parameters from the one or more received trigger signals. Additionally, the techniques can be implemented such that the set of key quality parameters is generated in accordance with a normalized grading scheme.

In general, in another aspect, the techniques can be implemented as a system comprising a trigger interface for receiving a set of key quality parameter, wherein a key quality parameter represents a characteristic associated with at least one network component; a mapping model repository for storing a service quality mapping module, wherein the service quality mapping module corresponds to at least one instance of an end customer service and defines a correlation between the set of key quality parameters and a set of customer quality parameters; a mapping engine for applying the service quality mapping module to the set of key quality parameters to generate the set of customer quality parameters; and an interface for outputting a signal representing at least one customer quality parameter.

The techniques also can be implemented such that the service quality mapping module defines a linear dependency between a customer quality parameter and at least one key quality parameter. Further, the techniques can be implemented such that the service quality mapping module further comprises a set of service quality parameters, wherein at least one service quality parameter is included for each network component involved in providing the at least one instance of an end customer service; a first correlation function defining a correlation between the set of key quality parameters and the set of service quality parameters; and a second correlation function defining a correlation between the set of service quality parameters and the set of customer quality parameters. Additionally, the techniques can be implemented to include processor electronics configured to perform operations comprising defining a correlation set corresponding to a customer quality parameter included in the set of customer quality parameters, wherein the correlation set comprises the customer quality parameter and each key quality parameter and service quality parameter correlated with the customer quality parameter; identifying one or more responsibility pools associated with at least one service quality parameter, key quality parameter, or customer quality parameter included in the correlation set; and outputting a signal representing the customer quality parameter corresponding to the correlation set to one or more departments associated with the one or more identified responsibility pools.

The techniques also can be implemented to include processor electronics configured to perform operations comprising retrieving service level agreement data from an end customer database, wherein the service level agreement data includes any combination of one or more predetermined key quality parameters, one or more predetermined service quality parameters, and one or more predetermined customer quality parameters; determining a deviation between the retrieved service level agreement data and one or more corresponding parameters included in any of the set of key quality parameters, the set of service quality parameters, and the set of customer quality parameters; and outputting a signal indicating the determined deviation. Further, the techniques can be implemented such that the processor electronics are further configured to output the signal to a department responsible for at least one key quality parameter, service quality parameter, or customer quality parameter that deviates from the retrieved service level agreement data. Additionally, the techniques can be implemented such that the trigger interface is further configured to generate the set of key quality parameters in accordance with one or more received trigger signals.

In general, in another aspect, the techniques can be implemented as a computer program product, encoded on a computer-readable medium, operable to cause data processing apparatus to perform operations comprising receiving a set of key quality parameters, wherein a key quality parameter represents a characteristic associated with at least one network component; identifying a service quality mapping module based on one or more network components associated with providing an end customer service, wherein the service quality mapping module corresponds to at least one service instance and defines a correlation between the set of key quality parameters and a set of customer quality parameters; applying the service quality mapping module to the set of key quality parameters to generate the set of customer quality parameters; and outputting a signal representing at least one customer quality parameter included in the set of customer quality parameters.

The techniques also can be implemented such that the service quality mapping module defines a linear dependency between a customer quality parameter and at least one key quality parameter. The techniques further can be implemented such that the service quality mapping module further comprises a set of service quality parameters, wherein at least one service quality parameter is included for each network component involved in providing the end customer service; a first correlation function defining a correlation between the set of key quality parameters and the set of service quality parameters; and a second correlation function defining a correlation between the set of service quality parameters and the set of customer quality parameters. Additionally, the techniques can be implemented to be further operable to cause data processing apparatus to perform operations comprising defining a correlation set corresponding to a customer quality parameter included in the set of customer quality parameters, wherein the correlation set comprises the customer quality parameter and each key quality parameter and service quality parameter correlated with the customer quality parameter; identifying one or more responsibility pools associated with at least one service quality parameter, key quality parameter, or customer quality parameter included in the correlation set; and outputting a signal representing the customer quality parameter corresponding to the correlation set to one or more departments associated with the one or more identified responsibility pools.

The techniques also can be implemented to be further operable to cause data processing apparatus to perform operations comprising retrieving service level agreement data from an end customer database, wherein the service level agreement data includes any combination of one or more predetermined key quality parameters, one or more predetermined service quality parameters, and one or more predetermined customer quality parameters; determining a deviation between the retrieved service level agreement data and one or more corresponding parameters included in any of the set of key quality parameters, the set of service quality parameters, and the set of customer quality parameters; and outputting a signal indicating the determined deviation. Additionally, the techniques can be implemented to be further operable to cause data processing apparatus to perform operations comprising outputting the signal to a department responsible for at least one key quality parameter, service quality parameter, or customer quality parameter that deviates from the retrieved service level agreement data.

The techniques also can be implemented to be further operable to cause data processing apparatus to perform operations comprising receiving one or more trigger signals, wherein a trigger signal represents a characteristic associated with at least one network component and generating the set of key quality parameters from the one or more received trigger signals. Further, the techniques can be implemented such that the set of key quality parameters is generated in accordance with a normalized grading scheme.

The techniques described in this document can be implemented to realize one or more of the following advantages. For example, the techniques can be implemented to provide a support tool for establishing and/or managing a relationship between the quality perceived by a customer and the performance of an underlying technology and/or processes. Further, the techniques can be implemented such that the relationship between quality perceived by a customer and the performance of underlying technology and/or processes is based on an end-to-end service view. Additionally, the techniques can be implemented to provide metrics, processes, and technology for analyzing and managing the quality of service delivered to one or more customers.

The techniques also can be implemented to incorporate and manage service quality aspects along the service delivery chain. Further, the techniques can be implemented to improve reliability and flexibility in delivered service quality by supporting the refinement of associated technology and processes. Additionally, the techniques can be implemented to permit evaluating and directing the allocation of infrastructure investments. The techniques further can be implemented to manage customer perception at least partly based on a predetermined and/or adaptable correlation of received performance data with customer perception data.

The techniques also can be implemented such that a set of key quality parameters and/or a set of customer quality parameters have identical structures for a plurality of service quality mapping functions, i.e. the number and meaning of the parameters are same and their values can be obtained by respective service quality mapping functions. The techniques further can be implemented such that the internal structure, i.e. the number and structuring, of the service quality parameters and the first and second correlation functions may differ between different end customer services, different service instances, and different service pools to provide for a modular system construction and to facilitate adaptation and customization to a specific implementation.

Additionally, the techniques can be implemented to include CSK monitoring, which may provide telecommunications companies and/or internet providers with relevant data for analyzing the service quality that is delivered to the customer, thereby permitting investments to be made at the right place and to fine tune operations to improve or maximize the delivered service quality of investments.

The disclosed general and specific techniques can be implemented using an apparatus, a method, a computer program product, a system, or any combination of an apparatus, methods, computer program products, and systems. The details of one or more implementations are set forth in the accompanying drawings and the description below. Further features, aspects, and advantages will become apparent from the description, the drawings, and the claims. It should be understood that even though implementations are separately depicted, features of two or more implementations may be combined.

BRIEF DESCRIPTION OF THE DRAWINGS

Like reference symbols indicate like elements throughout the specification and drawings.

DETAILED DESCRIPTION

Figure 1:
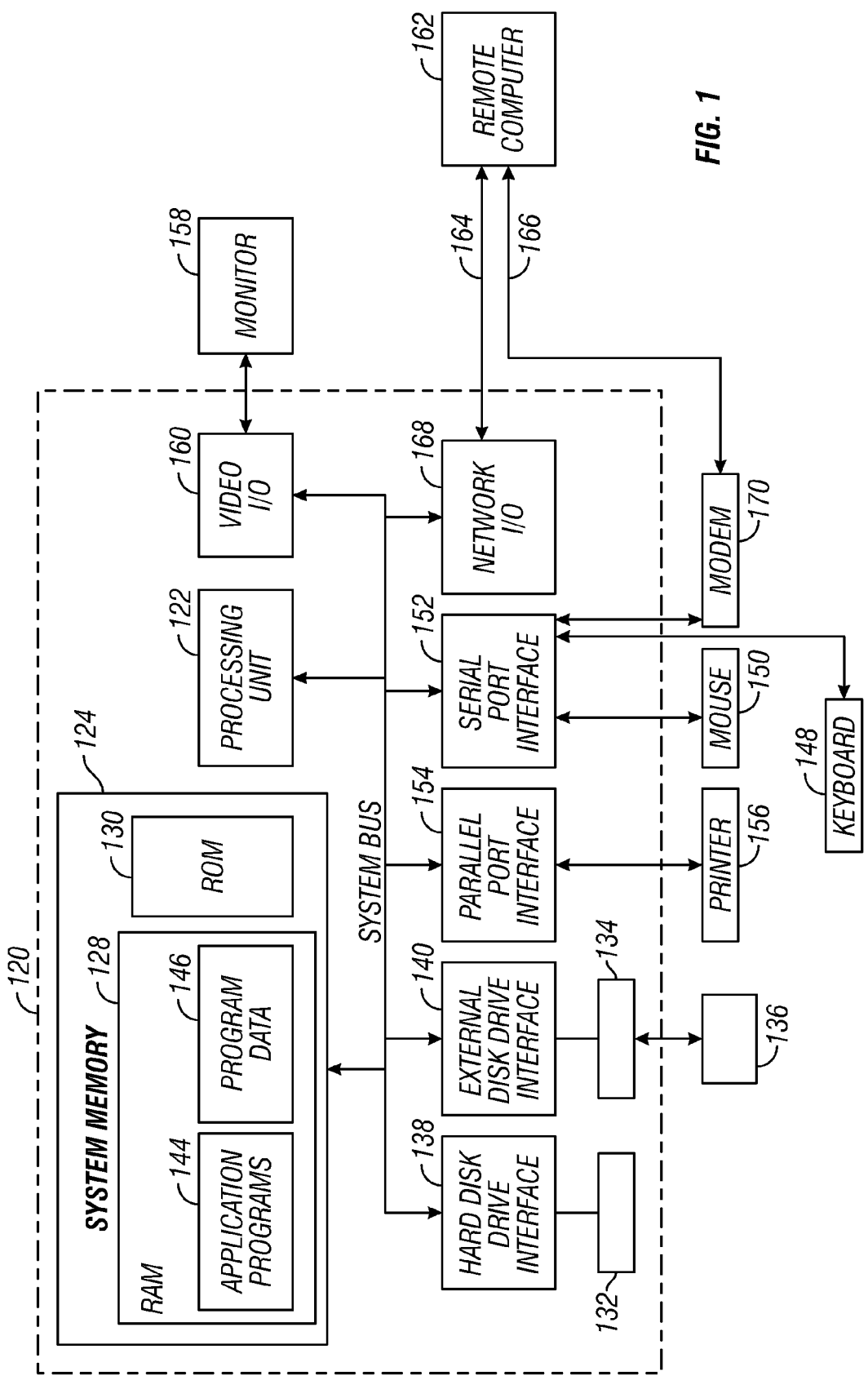
FIG. 1 shows an exemplary system for implementing network performance management.

With reference to FIG. 1, an exemplary system for implementing network performance management includes a general purpose computing device in the form of a conventional computing environment 120 (e.g. personal computer), including a processing unit 122, a system memory 124, and a system bus 126, that couples various system components including the system memory 124 to the processing unit 122. The processing unit 122 may perform arithmetic, logic, and/or control operations by accessing system memory 124. The system memory 124 may store information and/or instructions for use in combination with processing unit 122. The system memory 124 may include volatile and non-volatile memory, such as random access memory (RAM) 128 and read only memory (ROM) 130. A basic input/output system (BIOS) containing the basic routines that helps to transfer information between elements within the personal computer 120, such as during start-up, may be stored in ROM 130. The system bus 126 may be any of several types of bus structures including a memory bus or memory controller, a peripheral bus, and a local bus using any of a variety of bus architectures.

The personal computer 120 may further include a hard disk drive 132 for reading from and writing to a hard disk (not shown), and an external disk drive 134 for reading from or writing to a removable disk 136. The removable disk may be a magnetic disk for a magnetic disk drive or an optical disk such as a CD ROM for an optical disk drive. The hard disk drive 132 and external disk drive 134 are connected to the system bus 126 by a hard disk drive interface 138 and an external disk drive interface 140, respectively. The drives and their associated computer-readable media provide nonvolatile storage of computer readable instructions, data structures, program modules and other data for the personal computer 120. The data structures may include relevant data of the implementation of the present invention, as described in more details below. The relevant data may be organized in a database, for example a relational or object database.

In another implementation, other types of computer readable media that can store data that is accessible by a computer, such as magnetic cassettes, flash memory cards, digital video disks, random access memories, read only memories, and the like, may also be used in the exemplary operating environment.

One or more program modules may be stored on the hard disk drive 132, removable disk 136, ROM 130 or RAM 128, including an operating system (not shown), one or more application programs 144, other program modules (not shown), and program data 146. In an implementation, the application programs may include at least a part of the network performance management functionality.

A user may enter commands and information, as discussed below, into the personal computer 120 through one or more input devices, such as a keyboard 148 and a mouse 150. Other input devices (not shown) may include a microphone (or other sensors), a joystick, a game pad, a scanner, or the like.

These and other input devices may be connected to the processing unit 122 through a serial port interface 152 that is coupled to the system bus 126, or may be collected by other interfaces, such as a parallel port interface 154, a game port, or a universal serial bus (USB). Further, information may be printed using printer 156. The printer 156, and other parallel input/output devices may be connected to the processing unit 122 through a parallel port interface 154. A monitor 158 or other type of display device is also connected to the system bus 126 via an interface, such as a video input/output 160. In addition to the monitor 158, the computing environment 120 may include other peripheral output devices (not shown), such as speakers or other audible output.

The computing environment 120 may communicate with other electronic devices such as a computer, a telephone (wired or wireless), a personal digital assistant, a television, or the like. To communicate, the computer environment 120 may operate in a networked environment using connections to one or more electronic devices. FIG. 1 depicts the computer environment networked with remote computer 162. The remote computer 162 may be another computing environment such as a server, a router, a networked PC, a peer device or other common network node, and may include any or all of the elements described above relative to the computing environment 120. The logical connections depicted in FIG. 1 include a local area network (LAN) 164 and a wide area network (WAN) 166. Such networking environments are commonplace in offices, enterprise-wide computer networks, intranets, and the Internet.

When used in a LAN networking environment, the computing environment 120 may be connected to the LAN 164 through a network I/O 168. When used in a WAN networking environment, the computing environment 120 may include a modem 170 or other means for establishing communications over the WAN 166. The modem 170, which may be internal or external to computing environment 120, is connected to the system bus 126 via the serial port interface 152. In a networked environment, program modules depicted relative to the computing environment 120, or portions thereof, may be stored in a remote memory storage device resident on or accessible to a remote computer 162. Furthermore other data relevant to the application of the insurance claim management evaluation method (described in more detail further below) may be resident on or accessible via the remote computer 162. The data may be stored for example in an object or a relation database. In another implementation, other means of establishing a communications link between the electronic devices may be used.

Figure 2:
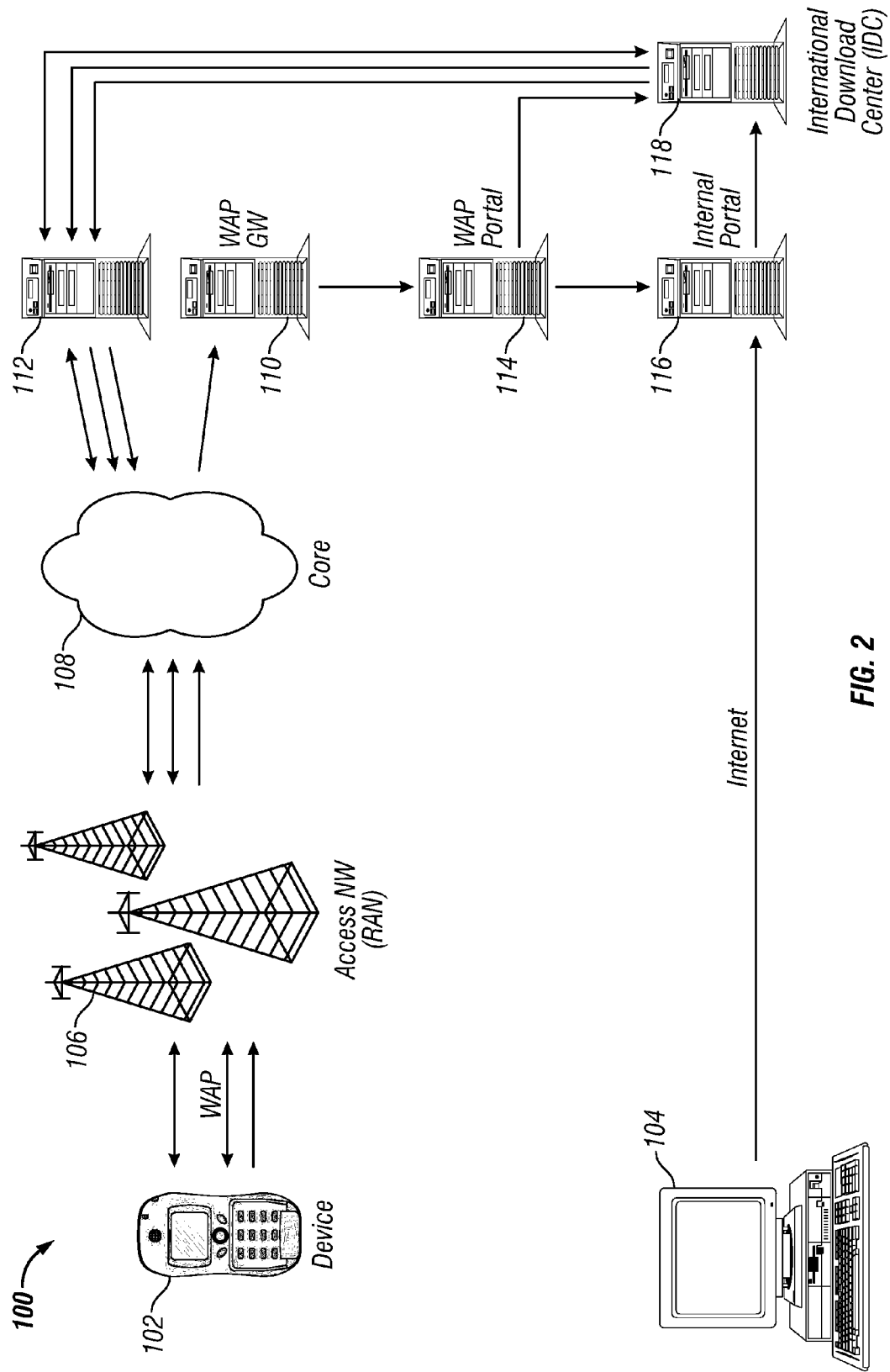
FIG. 2 shows an exemplary network comprising a plurality of network components.

FIG. 2 shows an exemplary network 100 comprising a plurality of network components such as a first device 102, a second device 104, an access network 106, a core network 108, a WAP gateway 110, an SMS server 112, a WAP portal 114, an Internet Portal 116, and a third-party download center 118. The network 100 also can comprise one or more applications running on individual devices and/or on a linked combination of two or more devices simultaneously. Such applications may interact with the devices and/or the network transport structure. For example, a complete network including hardware components, transmission performance, applications, portal functions, information provided to the end user of the first device 102 and/or the second device 104, etc. can be considered the network 100.

Figure 3A:
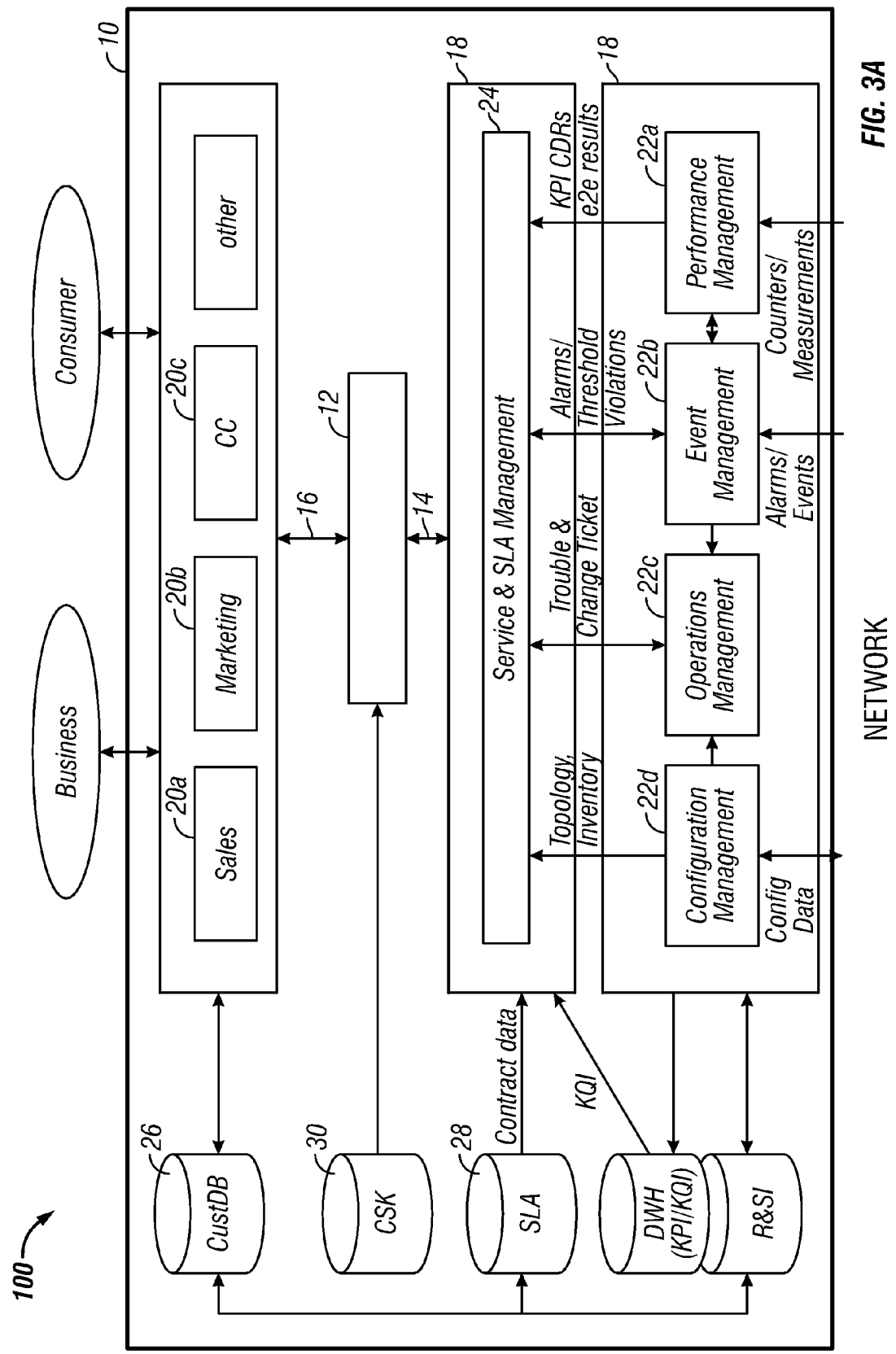
FIG. 3A presents a schematic of an exemplary system.

FIG. 3A presents a schematic of an exemplary system. The system 10 comprises a mapping engine 12 having an input queue 14 and an output queue 16. Via the input queue 14 the mapping engine 12 receives input data from a trigger interface 18. The input data can include key quality parameters (KQI) (key quality indicators) received from the trigger interface 18. After performing a mapping process as described in more detail below, the mapping engine 12 outputs a resulting signal through the output queue 16 to a plurality of responsibility department interfaces, including responsibility department interfaces 20a, 20b, and 20c, that can be allocated to different services or different departments. For example, a first responsibility department interface 20a may be associated with sales and a second responsibility department interface 20b may be associated with marketing.

The system 10 further comprises a plurality of management modules, including management modules 22a, 22b, 22c, and 22d. The performance management module 22a performs automated detection and/or measurement and/or counting of specific network characteristics of the network 100. The performance management module 22a may automatically measure at least one of the following: an available bandwidth, a response time of one or more individual network components, an availability of certain information, an error rate during transmission of data, etc. Alternatively or additionally, the performance management module 22a may receive manual input data characterizing certain conditions of the network 100. Based on the received network characteristics, the performance management module 22a sends trigger data to a parameter combination module 24 provided as part of the trigger interface 18.

Similar to the performance management module 22a an event management module 22b may receive signals such as alarms and/or events from the network 100 and transmit respective trigger data to the parameter combination module 24. Additionally, a configuration management module 22d may, for example, receive configuration data from the network 100 and transmit respective trigger data to the parameter combination module 24.

As shown in FIG. 3A, the system 10 further comprises a customer database 26 defining details about a plurality of end customers. The customer database 26 can be directly or indirectly linked to a service level agreement database 28. In an implementation, the service level agreement database 28 stores detailed information about contract data, including service level agreements with particular customers or customer segments, e.g. groups of customer having similar interests. The service level agreement data stored in the service level agreement database 28 may define a plurality of agreed customer quality parameters and/or a plurality of agreed service quality parameters and/or a plurality of agreed key quality parameters and/or a plurality of agreed network performance characteristics in a customer or user specific way and/or depending on the specific service level.

Furthermore, the system 10 comprises a mapping model database 30 storing a plurality of model instances as will be described in more detail below. The system 10 may also include additional databases, such as databases associated with a resource and service inventory and/or a data warehouse that defines a correlation between trigger data and key quality indicators. For example, a correlation between trigger data and key quality indicators may be stored by means of a normalized grading scheme. The normalized grading scheme may represent a scheme which assigns a real number and/or an analog or digital signal to at least one of the received trigger signals such that the trigger signals are comparable to each other. The normalized grading scheme may be implemented as an adapter correlation function defining a correlation between at least one received trigger signal and at least one key quality parameter. Additionally, the trigger signals may comprise key performance indicators, process performance indicators, and/or operational performance indicators.

In an implementation, the additional databases can be connected to the trigger interface 18. In an implementation, each trigger signal can define a separate characteristic or parameter of network performance. Further, one or more of the characteristics or parameters can be automatically retrieved from the network by a sensing unit. Additionally, one or more of the characteristics or parameters can be input manually.

A received trigger signal also may be continuous, i.e. the trigger signal may have continuous values, such as a net speed, a bandwidth, a delay time, data package size, etc. Alternatively, a trigger signal may represent a discrete value, such as a binary value, e.g. conditions like "connected" or "disconnected", data transmission "in progress" or "completed", or an indication that the customer is "online" or "offline", etc.

Figure 3B:
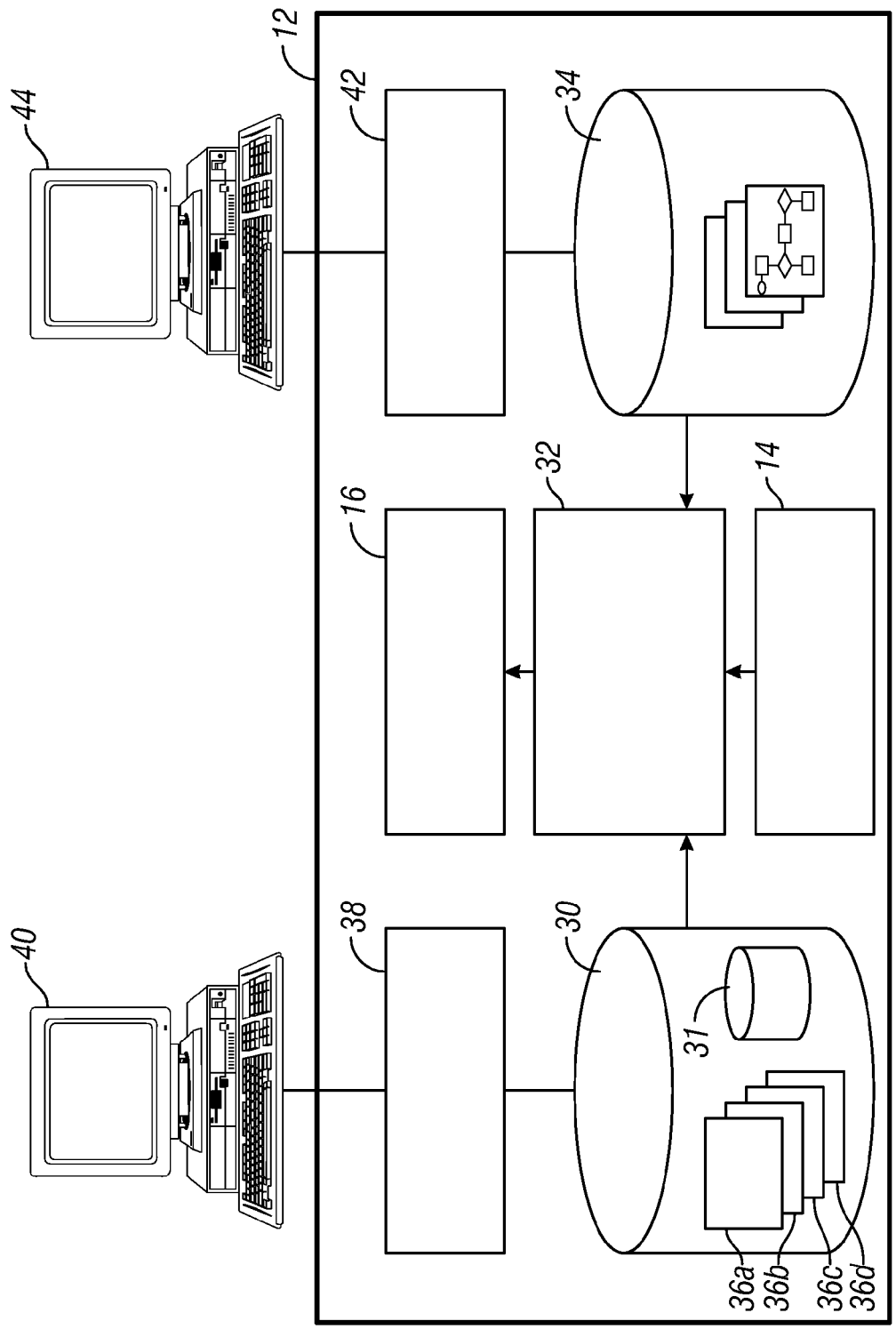
FIG. 3B depicts an exemplary mapping engine.

FIG. 3B shows the mapping engine 12 that may be applied in a system according to the implementation shown in FIG. 3A. The mapping engine 12 may comprise the input queue 14 for managing the input from the trigger interface 18 to an execution engine 32. Through the input queue 14 the mapping engine 12 receives key quality parameters to be processed in the execution engine 32. The mapping engine 12 further comprises the output queue 16 for managing, queuing, and/or routing the output, such as the signals and quality status actions that are to be sent to the responsibility department interfaces. The execution engine 32 communicates with the mapping module database 30 on the one hand and with a rule repository 34, on the other hand. In an implementation, the mapping model database 30 stores a plurality of model instances 36a, 36b, 36c, and 36d, each defining one or more correlation functions for at least one service instance as described in more detail below. The mapping model database 30 communicates with a model editor interface 38 through which a model editor 40 may be connected to the mapping engine 12 for adding and/or modifying model instances.

The mapping model database 30 further comprises a persistence database 31 for analyzing the performance of the network 100 and for analyzing the service quality over time.

The rule repository 34 may store a responsibility matrix for determining a responsibility of individual responsibility departments for particular components and parameters of the network performance. The rule repository 34 communicates via a rule editor interface 42 with a rule editor 44.

Figure 4:
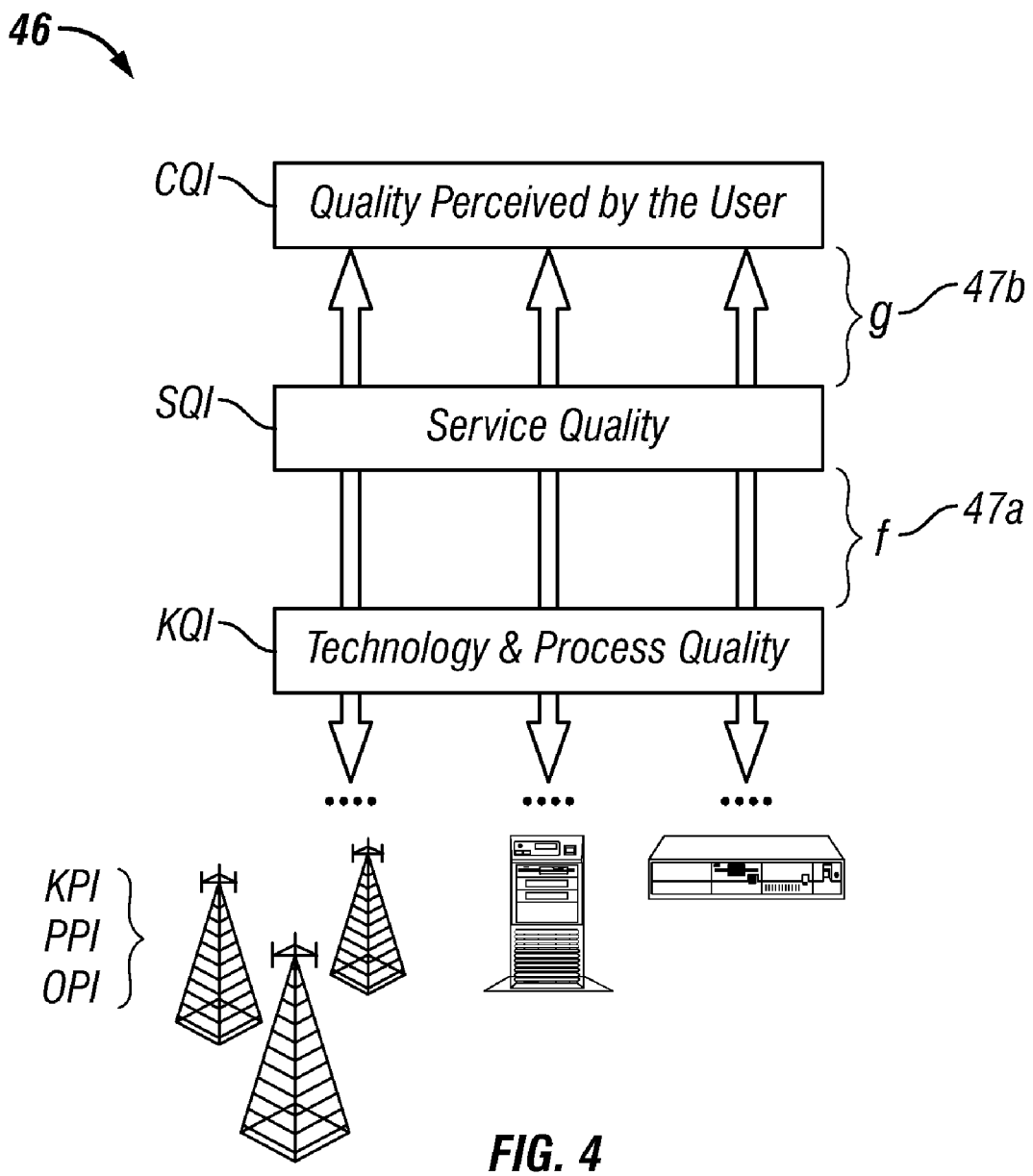
FIG. 4 shows a schematic of a service quality mapping module.

FIG. 4 shows a schematic of a service quality mapping module 46 which the execution engine 32 may apply in order to obtain a set of customer quality parameters CQI based on a received set of key quality parameters KQI. The service quality mapping module 46 comprises various parameter levels. A lower parameter level is formed by the set of key quality parameters KQI. An intermediate parameter level is formed by a set of service quality parameters SQI and a higher parameter level is formed by the set of customer quality parameters CQI. Individual parameters between neighboring parameter levels are correlated via correlation functions. In particular, the individual service quality parameters $SQI_k$ are related to individual key quality parameters $KQI_j$ via a first correlation function (f) 47a $SQI_k=f_k(KQI_{j=1}, \ldots)$. Furthermore, the individual customer quality parameters $CQI_i$ are related to individual service quality parameters $SQI_k$ via a second correlation function (g) 47b $CQI_k=g_i(SQI_{k=1}, \ldots)$.

Figure 5:
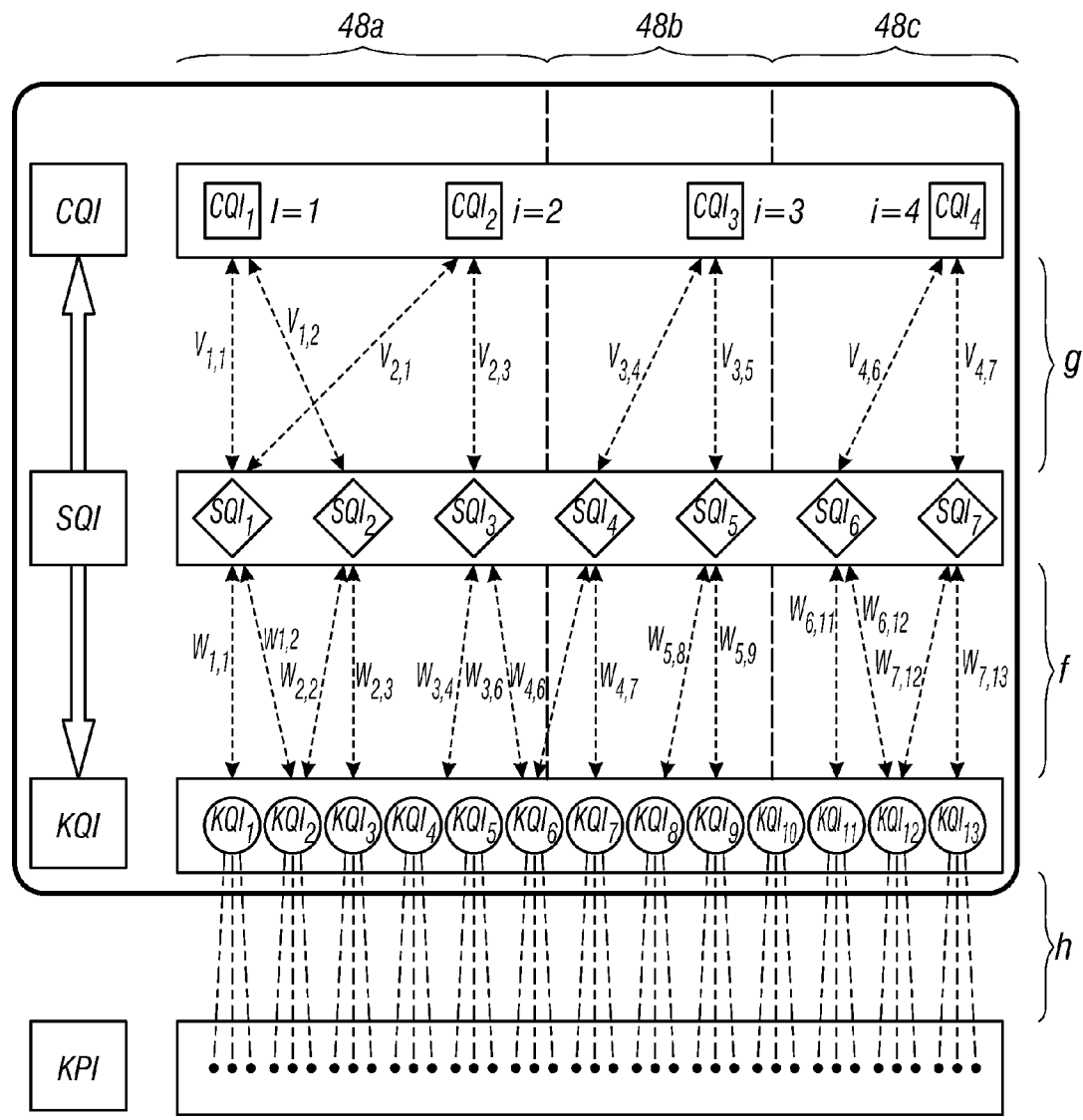
FIG. 5 shows an exemplary service quality mapping module.

FIG. 5 shows a service quality mapping module. In an implementation, the first and second correlation functions (f) and (g) particularly define a linear correlation between individual quality parameters. Accordingly, the correlations are defined by a linkage between parameters of neighboring parameter levels and one or more weighting factors. For example, the customer quality parameter $CQI_1$ is linked to the service quality parameters $SQI_1$ and $SQl_2$ via the weighting factors $v_{1,1}$ and $v_{1,2}$, respectively. This means that the customer quality parameter $CQI_1$ can be obtained from the set of service quality parameters by applying the equation $$CQI_1=v_{1,1}*SQI_1+v_{1,2}*SQI_2.$$

Moreover, the service quality parameter $SQI_1$ is linked to the key quality parameters $KQI_1$ and $KQI_2$ via the weighting factors $w_{1,1}$ and $w_{1,2}$, respectively. Accordingly, the service quality parameter $SQI_1$ can be obtained from the set of key quality parameters $KQI_j$ by applying the equation $$SQI_1=w_{1,1}*KQI_1+w_{1,2}*KQI_2.$$

The weighing factors may be customized and adapted to a particular service instance via the model editor 40 and they can be stored in the model database 30 as components of the model instances.

As further shown in FIG. 5, the set of key quality parameters KQI may be obtained from a plurality of trigger signals $KPI_1$, $KPI_2$, etc. For example, the set of key quality parameters KQI may be obtained from the trigger signals $KPI_1$, by applying a third correlation function (h) 47c. In an implementation, the third correlation function (h) represents the normalized grading scheme, as mentioned above, which can be applied to the plurality of trigger signals $KPI_1$ by means of an adapter tool kit. In an implementation, the adapter tool kit can be included in the trigger interface 18. At least some of the adapters comprising the adapter tool kit can be included in the parameter combination module 24 of the system 10, as shown in FIG. 3A. In another implementation, the normalized grading scheme can represent a scheme that assigns a numerical value, such as a key quality parameter, and/or an analog or digital signal (which may also be referred to as key quality parameters) to each of the plurality of received input information and/or physical conditions represented by the trigger signals depending on the individual adapter component. Since the trigger signal can represent signals of different types and scaling, adequate adapter components can be applied to generate a normalized grading of the trigger signals such that the resulting key quality parameters can be processed on a normalized scale (i.e. the scales are adapted to each other to be comparable) for further mapping in the mapping engine 12. In still another implementation, the trigger signals may comprise at least one key performance indicator (KPI) and/or at least one process performance indicator (PPI) and/or at least one operational performance indicator (OPI).

As further indicated in FIG. 5, the first, second, and third parameter levels, i.e. the set of key quality parameters KQI, the set of service quality parameters SQI, and the set of customer quality parameters CQI, are structured such that they are divided into a plurality of responsibility pools. A responsibility pool can define a group of parameters for which a particular department of a service provider may be responsible. Accordingly, in an implementation, one or more of the responsibility pools are related to a respective responsibility department interface, such as the responsibility department interfaces 20a, 20b, and 20c as shown in FIG. 3A. In particular, three responsibility pools 48a, 48b, and 48c are shown in FIG. 5, where each responsibility pool extends over all three parameter levels, i.e. the set of key quality parameters, the set of service quality parameters, and the set of customer quality parameters. Each of the responsibility pools 48a, 48b, and 48c includes at least one quality parameter within each of the three parameter levels. Further, each of the responsibility pools may be assigned to at least one responsibility department interface 20, as shown in FIG. 3A.

Additionally, a responsibility set may be determined for each quality parameter. Referring to the customer quality parameter $CQI_3$, for example, a correlation set defining quality parameters that are downwardly correlated with said customer quality parameter is determined. When analyzing the correlations indicated in the exemplary service quality mapping module shown in FIG. 5, it can be seen that this correlation set comprises the following parameters: $CQI_3$, $SQI_4$, $SQI_5$, $KQI_5$, $KQI_6$, $KQI_7$, $KQI_8$. Further, a responsibility set can be determined by searching for all responsibility pools containing at least one parameter associated with the correlations set. The responsibility set corresponding to $CQI_3$, therefore, comprises the first responsibility pool 48a and the second responsibility pool 48b. Accordingly, departments or services responsible for these responsibility pools may be informed via the respective responsibility department interface about the status of the customer quality parameter $CQI_3$ and about any deviation of this customer quality parameter CQI from the respective service level agreement data stored in the service level agreement database 28. In an implementation, a signal can be output to inform a depart or service only if the deviation exceeds a primary threshold value. In another implementation, the signal can be output only if the deviation exceeds a secondary threshold value that is higher than the primary threshold value.

Figure 6A:
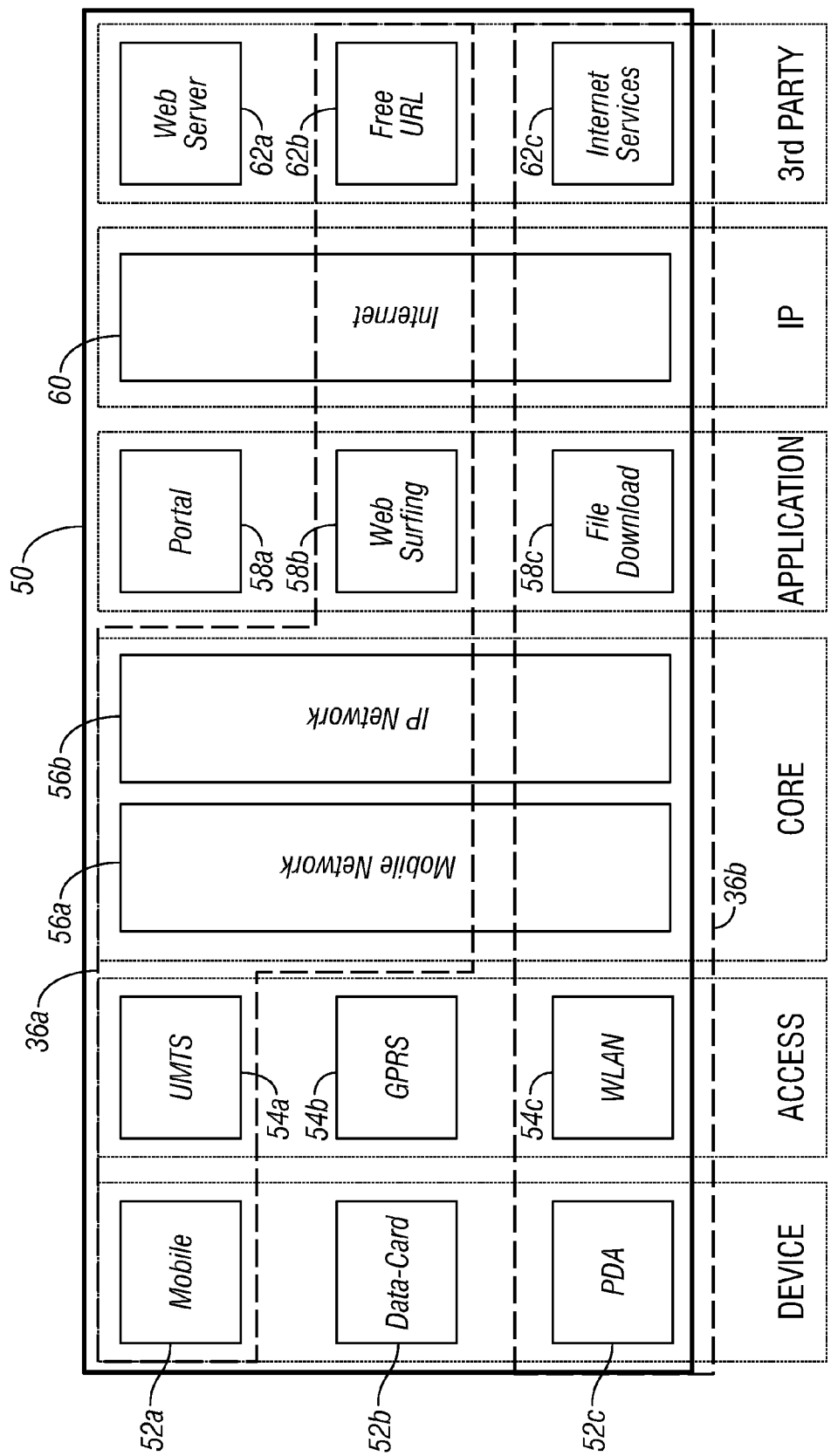
FIGS. 6A and 6B depict schematic structuring of exemplary service quality mapping modules.

FIG. 6A shows a schematic example of an end customer service 50 delivered by a network, such as the network 100 shown in FIG. 2. The network also can comprise a plurality of network components. For example, the end customer service 50 can involve different end user devices, such as a mobile phone 52a, a data card 52b, and a PDA 52c. The end customer service 50 further can comprise various access components such as a UMTS network 54a, a GPRS network 54b, and a WLAN network 54c. Moreover, the end customer service 50 can comprise two different core networks, such as a mobile network 56a and an IP network 56b. Further, various types of application components can be included in the end customer service 50, such as a portal 58a, Web surfing 58b, and file downloading 58c. Moreover, the end customer service 50 also can include the Internet 60 as a network component. Additionally, the end customer service 50 can include third-party network components, including a web server 62a, a free URL 62b, and Internet services 62c.

An end customer service may comprise one or more closed chains of network components, i.e. one or more service instances. A service instance represents an end-to-end chain of network components associated with one application offered to an end customer as part of an end customer service. The chain of network components forms a closed chain of associated network components for delivering an element, task, and/or component of the end customer service from a service provider to an end customer. A service instance can comprise a non-branched chain of network components or a branched chain of network components. For example, separate applications and/or separate tasks offered within an end customer service may be represented by separate service instances within the end customer service. In another implementation, a service instance may be identical to the end customer service, i.e. an end customer service is not divided into different service instances. In such an implementation, each service instance may represent a complete end customer service.

In the implementation shown in FIG. 6A, the end customer service 50 can be structured as two closed chains of network components, each representing a particular service instance delivered to the end customer. The first service instance 36a provides the end customer with a service that permits surfing the Internet via a mobile phone 52a. Therefore, all of the network components incorporated in this task are included in the first service instance 36a, including the mobile phone 52a, the UMTS network 54a, the mobile network 56a, the IP network 56b, web surfing 58b, the Internet 60, and the free URL 62b.

The second service instance 36b provides the end customer with access to the Internet via a PDA 52c, including the service of downloading files from the Internet by means of a PDA 52c. Accordingly, the network components associated with this task are included in the second service instance 36b.

Figure 6B:
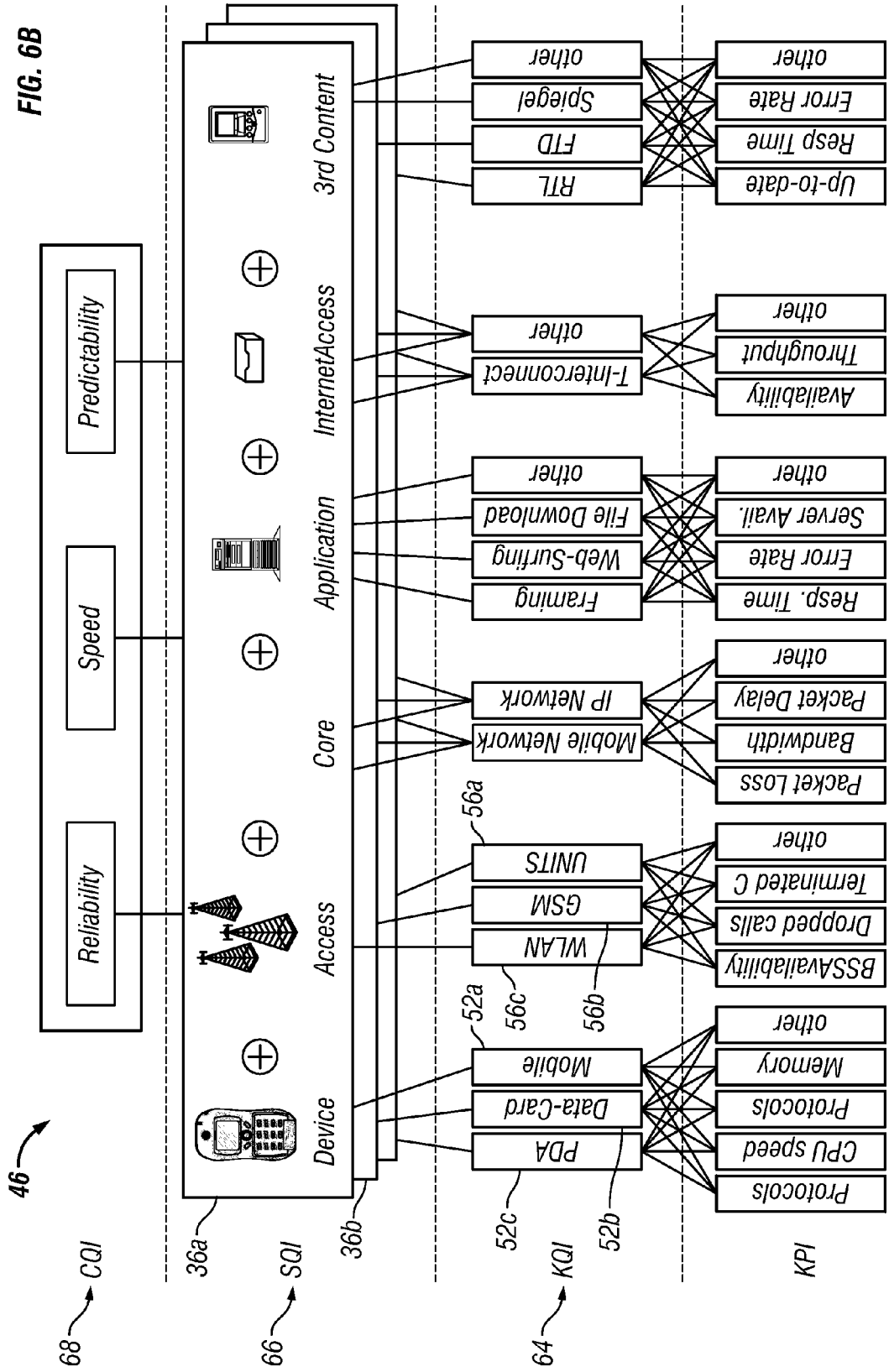

FIG. 6B shows a schematic of a service quality mapping module 46 for the network and the service instances of FIG. 6A. The key quality parameters KQI 64 represent characteristic parameters for the individual network components of the end customer service 50 described in connection with FIG. 6A. The key quality parameters KQI may represent one or more measures, including device reliability, GPRS/GSM availability, GPRS/GSM performance, UMTS availability, UMTS performance, framing server availability, framing server performance, etc. The service quality parameters SQI 66 represent characteristics of individual service instances, such as service instances 36a and 36b. The service quality parameters SQI may represent one or more measures, including device reliability, access availability, head end server availability, etc. The customer quality parameters CQI 68 can include the parameters "reliability", "speed", and "predictability". Further, the set of customer quality parameters CQI 68 also can include parameters such as "satisfaction" and/or "efficiency". In one implementation, separate correlation functions may be defined for each service instance. For example, a first instance quality mapping module may be defined for the first service instance 36a, while a second instance quality mapping module may be defined for the second service instance 36b of the end customer service 50. In another implementation, the service quality parameters for all service instances together with the respective correlation functions may be combined within one end customer service 50, i.e. one service quality mapping module may be defined for the end customer service 50. In another implementation, service quality mapping modules corresponding to a plurality of end customer services also may be combined.

Additionally, the instance quality mapping modules within a plurality of end customer services can be combined to form a service quality mapping module. Further, the service quality mapping modules for a plurality of end customer services may be combined. The separate sets of customer quality parameters also may be combined to form one set of customer quality parameters. In another implementation, the instance quality mapping modules of all service instances within one end customer service may be combined to form a service quality mapping module. For example, combining the sets of customer quality indicators and/or combining the instance quality mapping modules can be performed by adding their values, which can be weighted by one or more respective instance weighting factors.

Figure 7:
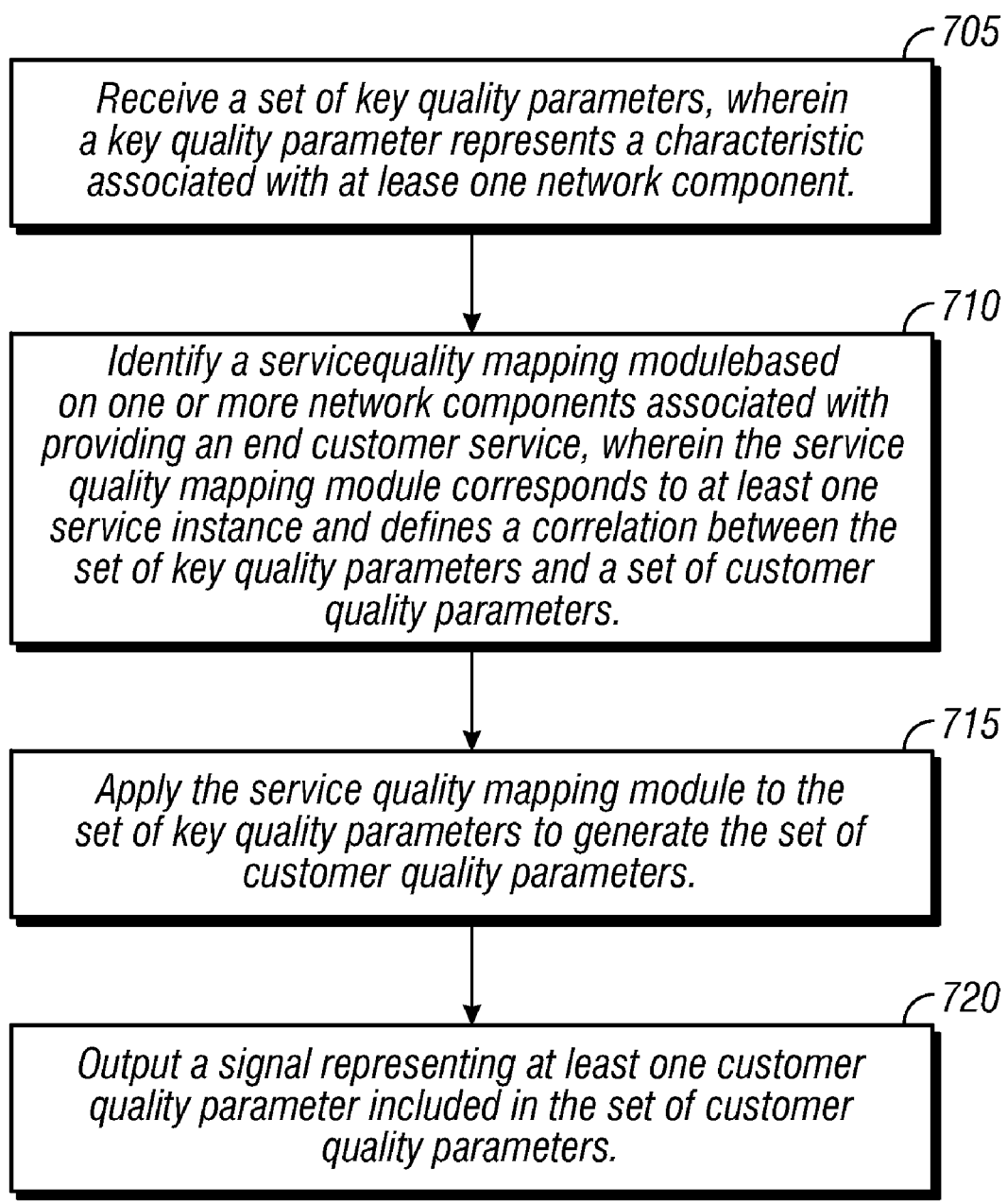
FIG. 7 presents a method of managing network performance.

FIG. 7 presents a method of managing network performance. A set of key quality parameters can be received, wherein a key quality parameter represents a characteristic associated with at least one network component (705). A service quality mapping module can be identified based on one or more network components associated with providing an end customer service, wherein the service quality mapping module corresponds to at least one service instance and defines a correlation between the set of key quality parameters and a set of customer quality parameters (710). The service quality mapping module can be applied to the set of key quality parameters to generate the set of customer quality parameters (715). Once the set of customer quality parameters has been generated, a signal representing at least one customer quality parameter included in the set of customer quality parameters can be output (720).

The techniques disclosed above can be implemented to include identifying at least one customer quality indicator (CQI); identifying at least a first provider quality indicator; and/or determining at least one first correlation factor between the at least one provider quality indicator and the at least one customer quality indicator. The customer quality indicator can define at least one particular aspect of the quality of service perceived by a user. Further, the provider quality indicator can define at least one particular aspect of the quality of the provided service. Additionally, the at least one provider quality indicator can comprise at least one service quality indicator (SQI) and/or at least one key quality indicator (KQI).

The techniques disclosed above also can be implemented to include identifying at least one customer quality indicator (CQI); identifying at least one service quality indicator (SQI); identifying at least one key quality indicator (KQI); determining at least one first correlation factor between the at least one service quality indicator and the at least one customer quality indicator; and/or determining at least one second correlation factor between the at least one key quality indicator and the least one service quality indicator. Further, at least one third correlation factor between the at least one key quality indicator and the least one customer quality indicator also can be determined. The customer quality indicator(s) (CQI) can describe and/or define the quality of service perceived by the customer. The service quality indicator can define at least one particular aspect of the quality of the provided service. The service quality indicator (SQI) can describe and/or define a quality of one or more services offered by the operator. The key quality indicator (KQI) can describe and/or define the quality and/or performance of one or more technological components, component chains, and/or processes. The customer quality indicators and/or parameters can include an aggregation of a plurality of perception factors. The service quality indicators and/or parameters can comprise service components. The key quality indicators can comprise key performance indicators (KPIs), process performance indicators (PPIs), and/or operational performance indicators (OPIs).

The customer quality indicators can comprise an indicator for satisfaction, an indicator for reliability, an indicator for efficiency, an indicator for predictability, and/or an indicator for speed. The service quality indicators can comprise an indicator for web-surfing, an indicator for E-mail retrieval, an indicator for file download, an indicator for video streaming, an indicator for a device, an indicator for access, an indicator for core, an indicator for an application, an indicator for internet access, and/or an indicator for third-party content. The key quality indicators can comprise an indicator for packet loss, an indicator for bandwidth, an indicator for packet delay, and/or an indicator for jitter. Each correlation factor can comprise a relationship and a weighting factor. The key quality indicators can be related to a PDA, a data-card, a mobile device, a WLAN, GSM, UMTS, a mobile network, an IP network, framing, web-surfing, file download, T-Interconnect, and/or third party content such as a television broadcast, a newspaper, and/or a magazine. The key performance indicators can be related to protocols, CPU speed, memory, BSS availability, dropped calls, terminated calls, packet loss, packet delay, response time, error rate, server availability, availability of internet access, throughput, and/or up-to-date.

A CSK model can be customized by identifying at least one representative user group; and/or designing and/or building quality of service testing infrastructure; and/or conducting a user group survey; and/or deriving weighting factors; and/or adapting quality of service parameters and relations. Identifying at least one representative user group comprises analyzing a customer database with respect to at least one service. Deriving weighting factors comprises determining at least one correlation factor between at least one service quality indicator and at least one customer quality indicator; and/or at least one correlation factor between at least one key quality indicator and at least one service quality indicator; and/or at least one correlation factor between at least one key quality indicator and at least one customer quality indicator.

Monitoring can be performed by receiving an input of at least one environmental parameter and/or at least one trigger and/or stored data; and outputting a signal defining at least one action and/or at least one service quality status. In an implementation, the environmental parameter can comprise a time and/or a date and/or a location and/or a day-of-week and/or an event and/or incidents. The trigger can comprise a trouble ticket and/or a threshold and/or an alarm and/or a KPI. The stored data can comprise customer data and/or SLA management data and/or resource data and/or service inventory data. The information defining an action can be directed to CRM and/or an account manager and/or information management and/or problem management and/or field force and/or notification and/or reporting. The service quality status can comprise and/or is related to a customer quality indicator.

Further, end-to-end organizational modeling can be performed by introducing a logical organizational layer representing the role of end-to-end service management, which is separate from network management; and/or implementing an end-to-end responsibility matrix with defined decision rights; and/or defining and/or adjusting OLAs between service management and other departments contributing to service management; and/or defining and/or communicating goals and/or tasks and/or responsibilities for service management within the organization; and/or adapting a company target-system to reflect a common service quality view.

In another implementation, a relationship can be established between quality as perceived by a user and the underlying technology and/or process parameters, including the modeling as described above; and/or customizing as described above; and/or monitoring as described above. Further, an end-to-end service can be modeled; and/or an end-to-end service can be monitored; and/or an end-to-end organization can be modeled as described above; and/or an end-to-end organization can be customized.

A computer system can be configured to perform operations according to the implementations described above. The computer system can comprise a CSK engine, which is capable of performing monitoring as described above.

A CSK model can be provided that comprises a first layer defining at least one customer quality indicator; and/or a second layer defining at least one provider quality indicator; and/or at least one correlation factor and/or weighting factor defining a relationship between the at least one provider quality indicator and the at least one customer quality indicator. Further, a CSK model can be provided that comprises a first layer defining at least one customer quality indicator (CQI); and/or a second layer defining at least one service quality indicator (SQI); and/or a third layer defining at least one key quality indicator (KQI); and/or at least one S-C correlation factor and/or weighting factor defining a relationship between the at least one service quality indicator and the at least one customer quality indicator; and/or at least one K-S correlation factor and/or weighting factor defining a relationship between the at least one key quality indicator and the at least one service quality indicator; and/or at least one K-C correlation factor and/or weighting factor defining a relationship between the at least one key quality indicator and the at least one customer quality indicator. A CSK model also can be provided that comprises a first layer defining a plurality of customer quality indicator (CQI); a second layer defining a plurality of service quality indicator (SQI); a third layer defining a plurality of key quality indicator (KQI); and a plurality of S-C correlation factors and/or weighting factors, each defining a relationship between at least one service quality indicator and at least one customer quality indicator; and/or a plurality of K-S correlation factors and/or weighting factors, each defining a relationship between at least one key quality indicator and at least one service quality indicator; and/or a plurality of K-C correlation factors and/or weighting factors, each defining a relationship between at least one key quality indicator and at least one customer quality indicator.

The model further can comprises a plurality of customer segments, wherein each customer segment comprises at least one customer quality indicator and/or at least one service quality indicator and/or key quality indicator, wherein the plurality of customer segments comprises technology and/or customer care and/or sales.

An end-to-end service model also can be provided that comprises a technical view; and/or a process view; and/or a performance view. The technical view comprises a device layer and/or an access layer and/or a transport layer and/or a control layer and/or an application layer and/or key performance indicators. The process view can comprise a customer related touchpoint for sales and/or a customer related touchpoint for marketing and/or a customer related touchpoint for CC and/or a customer related touchpoint for operations and/or process performance indicators. The performance view can monitor a plurality of technical resources and/or processes related to an end-to-end circuit; and/or a behaviour of single service components and/or end-to-end circuits.

The systems and methods described herein can be implemented in digital electronic circuitry, or in computer hardware firmware, software, or in combination of them. Further, the systems and methods can be implemented as a computer program product, i.e. a computer program tangibly embodied in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including a stand-along program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the systems and methods disclosed herein can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The systems and methods also can be implemented in a computing system that includes a back-end component, e.g., a data server, or that includes a middleware component, e.g., an application server, or that includes a front-end component, e.g., a client computer having a graphical user interface or an Web browser through which a user can interact, or any combination of such back-end, middleware, and front-end components. The components of the system can be interconnected by any form or medium of digital data communication, e.g., a communication network. Examples of communication networks include a local area network ("LAN"), a wide area network ("WAN"), and the Internet.

Further, the computing system can include clients and servers. A client and server are generally remote from each other and typically interact through a communication network. The client-server relationship arises by virtue of computer programs running on the respective computers and having a client-server relationship to each other.

A system and method for supporting management of service quality provides and operates on network specific metrics, and can correlate the network specific metrics with customer specific metrics.

A Customer-Service-Key (CSK) Service Quality Framework generally refers to a relationship between the quality as perceived by the user and underlying network parameters. The relationship between the customer and/or services and/or technology and/or processes can be modeled in a CSK model (Customer/Service/Key quality indicator model). The CSK model may then be customized through the determination of customer related weighting factors and may be applied to end-to-end services circuits reflecting the technical delivery mechanism.

A CSK monitoring engine monitors predefined quality indicators, such as key quality indicators (KQls) and/or key performance indicators (KPIs) covering network related performance and quality metrics, and/or calculates customer centric service quality (CCSQ) using the CSK model and/or the weighting factors. The resulting CCSQ data describes the service quality perceived by the customer.

In an implementation, the basic guiding principles of client centric service quality management comprise understanding the value of the customer; and/or aligning services with a customer centric view; and/or mapping processes and/or technology to services; and/or converging offered perceived quality.

In another implementation, the relationships between the customer, services, technology, and processes can be modeled (CSK Model); and/or the CSK model can be customized through the determination of customer related weighting factors w; and/or business logic (CSK relationships and weighting factors w) can be monitored within the framework of the interfacing business processes and systems.

Additionally, service can be organized by defining and/or implementing an end-to-end responsibility matrix with defined decision rights along the defined service models; and/or implementing a logical organizational layer representing the role of end-to-end service managers; and/or defining and/or implementing end-to-end processes and/or interfaces (Operational Level Agreements, OLAs) for service quality management.

The services of end-to-end circuits can be modeled to reflecting the technical delivery mechanism (basis for the CSK model), and/or services can be modeled on the basis of predefined quality indicators (KQls) and KPls covering network related performance and quality metrics.

A model can be established which defines a relationship between the quality received by a user and the underlying technology and/or process parameters. The model can comprise a customer quality indicator and/or a service quality indicator and/or a key quality indicator. Each of the quality indicators included in the model can comprises one or more indication parameters. The customer quality indicator can comprise a satisfaction parameter and/or a reliability parameter and/or an efficiency parameter and/or a predictability parameter. The service quality indicator can comprise a web-surfing parameter and/or an E-mail retrieval parameter and/or a file download parameter and/or a video streaming parameter. The key quality indicator can comprise a packet loss parameter and/or a band width parameter and/or a packet delay parameter and/or a jitter parameter. The model may further include a key performance indicator (KPI) and/or a process performance indicator (PPI) and/or an operational performance indicator (OPI).

The parameters of the quality indicators can cover a plurality of functional domains such as technology, customer care, sales, etc. When establishing the model, at least one customer quality parameter of the customer quality indicator and at least one additional parameter representing either the service quality indicator and the key quality indicator is identified. Further, at least one correlation factor w defining a correlation between the at least one customer quality parameter and the at least one additional parameter is determined. In an implementation, the model can comprise a plurality of customer quality parameters a plurality of service quality parameters, and a plurality of key quality parameters, and a plurality of customer/service quality correlation factors (exemplarily functioning as weighting factors v, w) and/or a plurality of service/key quality correlation factors (exemplarily functioning as weighting factors v, w) can be determined. Each customer/service quality correlation factor defines a correlation between one customer quality parameter and one service quality parameter while each of the service/key quality correlation factors defines a correlation between one service quality parameter and one key quality parameter. The correlation factors may define a correlation between parameters within the same functional domain and/or between parameters of different functional domains. The model can cover all services and/or affected customer segments (e.g. functional domains).

A CSK model also can be customized. The customization can determine what the customer receives as quality and can shows what key quality parameters are required for the customer quality indicators. Customization can comprise identifying representative use groups and/or designing and/or building quality of service testing infrastructure and/or conducting a user group survey and/or deriving weighting factors and/or adapting quality of service parameters and/or relations. The representative user groups may be identified on the basis of a customer database and each of the user groups maybe a representative for certain services. For example, the different user groups may comprise corporate, retail, and/or youth. Designing and/or building a quality of service testing infrastructure may comprise providing devices, such as mobile phones, and/or network access points (RAN), and/or a framing server, and/or a core network, and/or an internet access point, and/or an internet domain. The weighting factors associated with customization of the CSK model can define the correlation factors between quality parameters in a model, as defined above. The quality of service parameters and/or the relationships between the quality of service parameters can be adapted starting from a model, as described above, where the quality of service parameters represent customer quality parameters and/or services quality parameters and/or key quality parameters.

A CSK engine further can perform CSK monitoring and can comprise one or more CSK model instances. The CSK engine can receive input comprising at least one of environmental parameters, triggers, and stored data, and can provide at least one output defining a service quality status and/or a trigger to one or more other systems and/or process for further action based on the service status. The environmental parameters may comprise time and/or date and/or location and/or day-of-weak and/or events and/or incidents. The triggers may comprise trouble ticket and/or threshold and/or alarm and/or key performance indicators (KPI). The stored data may comprise customer data and or service level agreement (SLA) management data and/or resource data and/or service inventory data. The outputted trigger may be directed to CRM and/or account manager and/or information management and/or problem management and/or field force and/or notification and/or reporting. The service quality status may comprise a customer quality indicator (CQI).

The CSK monitoring execution engine (CSK engine) further can interact with a CSK model repository and/or CSK rules repository. The CSK model repository may store one or more instances of the CSK model and/or provide persistence for the analysis of service quality over time. The CSK rules repository can store business rules for use by the CSK monitoring execution engine. In an implementation, the CSK monitoring execution engine can receive an input queue and/or can be triggered by the input queue, where the input queue may manage the input to the execution engine and/or manage I/O to external data sources and/or associate data with CSK instances. The CSK monitoring execution engine can provide an output queue which manages (such as by queuing and/or routing) the output generated by the CSK monitoring Execution Engine. Further, the CSK monitoring execution engine can execute rules against specific CSK models to analyse quality and/or import environmental and/or stored data as required (rules).

The CSK model repository also can communicate with a CSK model editor which is capable of creating new CSK models as part of the service creation and/or customising process; and/or editing and/or updating the CSK model weightings; and/or importing CSK models in XML format from other sources such as service activation. The CSK model editor may comprise an application and/or a graphical user interface. Additionally, the CSK rules repository may communicate with a CSK business rules editor which can create and/or edit CSK rules for CSK model processing; and/or test existing and new rules.

A number of implementations have been described. Nevertheless, it will be understood that various modifications may be made without departing from the spirit and scope of the following claims.

REFERENCE NUMERALS 10 system
12 mapping engine
14 input queue
16 output queue
18 trigger interface
20a, 20b, 20c, 20d responsibility department interfaces
22a performance management module
22b event management module
22c operations management module
22d configuration management module
24 parameter combination module
26 customer database
28 service level agreement database
30 mapping module database, mapping module repository
32 execution engine
34 rule repository
36a, 36b, 36c, 36d model instances, service instances
38 model editor interface
40 model editor
42 rule editor interface
44 rule editor
46 service quality mapping module
48a, 48b, 48c responsibility pools
50 end customer service
52a mobile phone
52b data card
52c PDA (personal digital assistant)
54a UMTS
54b GPRS
54c WLAN
56a Mobile Network
56b IP Network
58a Portal
58b Web Surfing
58c File Download
60 Internet
62a Web Server
62b free URL
62c Internet Services
100 network
102 first end customer device
104 second end customer device
106 access network
108 core network
110 WAP gateway
112 SMS server
114 WAP portal
116 Internet Portal
118 3rd party download server
KQI set of key quality parameters
SQI set of service quality parameters
CQI set of customer quality parameters

What is claimed is:

1. A computer-implemented method comprising:
receiving a set of key quality parameters, wherein a key quality parameter represents a characteristic associated with at least one network component;
identifying, using one or more processors, a service quality mapping module based on one or more network components associated with providing an end customer service, wherein the service quality mapping module corresponds to at least one service instance and defines a correlation between the set of key quality parameters and a set of customer quality parameters, and wherein the service quality mapping module further comprises:
a set of service quality parameters, wherein at least one service quality parameter is included for each network component involved in providing the end customer service,
a first correlation function defining a correlation between the set of key quality parameters and the set of service quality parameters, and
a second correlation function defining a correlation between the set of service quality parameters and the set of customer quality parameters;
applying the service quality mapping module to the set of key quality parameters to generate the set of customer quality parameters;
outputting a signal representing at least one customer quality parameter included in the set of customer quality parameters;
retrieving service level agreement data from an end customer database, wherein the service level agreement data includes any combination of one or more predetermined key quality parameters, one or more predetermined service quality parameters, and one or more predetermined customer quality parameters;
determining a deviation between the retrieved service level agreement data and one or more corresponding parameters included in any of the set of key quality parameters, the set of service quality parameters, and the set of customer quality parameters; and
outputting a signal indicating the determined deviation.

2. The method of claim 1, wherein the service quality mapping module defines a linear dependency between a customer quality parameter and at least one key quality parameter.

3. The method of claim 2, wherein the linear dependency between the customer quality parameter and the at least one key quality parameter includes one or more weighting factors.

4. The method of claim 1, wherein at least one of the first correlation function and the second correlation function includes one or more weighting factors.

5. The method of claim 1, further comprising outputting the signal to a department responsible for at least one key quality parameter, service quality parameter, or customer quality parameter that deviates from the retrieved service level agreement data.

6. The method of claim 1, wherein the set of customer quality parameters indicates at least one aspect of a service quality perceived by an end customer.

7. The method of claim 1, wherein the service quality mapping module comprises a plurality of instance quality mapping modules, each instance quality mapping module corresponding to a service instance.

8. The method of claim 7, wherein applying the service quality mapping module further comprises:

applying at least one of the plurality of instance quality mapping modules to one or more key quality parameters included in the set of key quality parameters to generate one or more customer quality parameters associated with the corresponding service instance.

9. The method of claim 1, wherein receiving the set of key quality parameters further comprises:
receiving one or more trigger signals, wherein a trigger signal represents a characteristic associated with at least one network component; and
generating the set of key quality parameters from the one or more received trigger signals.

10. The method of claim 9, wherein the set of key quality parameters is generated in accordance with a normalized grading scheme.

11. A computer-implemented method comprising:
receiving a set of key quality parameters, wherein a key quality parameter represents a characteristic associated with at least one network component;
identifying, using one or more processors, a service quality mapping module based on one or more network components associated with providing an end customer service, wherein the service quality mapping module corresponds to at least one service instance and defines a correlation between the set of key quality parameters and a set of customer quality parameters, and wherein the service quality mapping module further comprises:
a set of service quality parameters, wherein at least one service quality parameter is included for each network component involved in providing the end customer service,
a first correlation function defining a correlation between the set of key quality parameters and the set of service quality parameters, and
a second correlation function defining a correlation between the set of service quality parameters and the set of customer quality parameters;
applying the service quality mapping module to the set of key quality parameters to generate the set of customer quality parameters;
outputting a signal representing at least one customer quality parameter included in the set of customer quality parameters;
defining a correlation set corresponding to a customer quality parameter included in the set of customer quality parameters, wherein the correlation set comprises the customer quality parameter and each key quality parameter and service quality parameter correlated with the customer quality parameter;
identifying one or more responsibility pools associated with at least one service quality parameter, key quality parameter, or customer quality parameter included in the correlation set; and
outputting a signal representing the customer quality parameter corresponding to the correlation set to one or more departments associated with the one or more identified responsibility pools.

12. A system comprising:
one or more computers; and
a computer-readable medium coupled to the one or more computers having instructions stored thereon which, when executed by the one or more computers, cause the one or more computers to perform operations comprising:
receiving a set of key quality parameters, wherein a key quality parameter represents a characteristic associated with at least one network component;
identifying a service quality mapping module based on one or more network components associated with providing an end customer service, wherein the service quality mapping module corresponds to at least one service instance and defines a correlation between the set of key quality parameters and a set of customer quality parameters, and wherein the service quality mapping module further comprises:
a set of service quality parameters, wherein at least one service quality parameter is included for each network component involved in providing the end customer service,
a first correlation function defining a correlation between the set of key quality parameters and the set of service quality parameters, and
a second correlation function defining a correlation between the set of service quality parameters and the set of customer quality parameters;
applying the service quality mapping module to the set of key quality parameters to generate the set of customer quality parameters;
outputting a signal representing at least one customer quality parameter included in the set of customer quality parameters;
retrieving service level agreement data from an end customer database, wherein the service level agreement data includes any combination of one or more predetermined key quality parameters, one or more predetermined service quality parameters, and one or more predetermined customer quality parameters;
determining a deviation between the retrieved service level agreement data and one or more corresponding parameters included in any of the set of key quality parameters, the set of service quality parameters, and the set of customer quality parameters; and
outputting a signal indicating the determined deviation.

13. The system of claim 12, wherein the service quality mapping module defines a linear dependency between a customer quality parameter and at least one key quality parameter.

14. The system of claim 13, wherein the linear dependency between the customer quality parameter and the at least one key quality parameter includes one or more weighting factors.

15. The system of claim 12, wherein at least one of the first correlation function and the second correlation function includes one or more weighting factors.

16. The system of claim 12, wherein the operations further comprise outputting the signal to a department responsible for at least one key quality parameter, service quality parameter, or customer quality parameter that deviates from the retrieved service level agreement data.

17. The system of claim 12, wherein the set of customer quality parameters indicates at least one aspect of a service quality perceived by an end customer.

18. The system of claim 12, wherein the service quality mapping module comprises a plurality of instance quality mapping modules, each instance quality mapping module corresponding to a service instance.

19. The system of claim 12, wherein applying the service quality mapping module further comprises:
applying at least one of the plurality of instance quality mapping modules to one or more key quality parameters included in the set of key quality parameters to generate one or more customer quality parameters associated with the corresponding service instance.

20. The system of claim 12, wherein receiving the set of key quality parameters further comprises:
receiving one or more trigger signals, wherein a trigger signal represents a characteristic associated with at least one network component; and
generating the set of key quality parameters from the one or more received trigger signals.

21. The system of claim 20, wherein the set of key quality parameters is generated in accordance with a normalized grading scheme.

22. A system comprising:
one or more computers; and
a computer-readable medium coupled to the one or more computers having instructions stored thereon which, when executed by the one or more computers, cause the one or more computers to perform operations comprising:
receiving a set of key quality parameters, wherein a key quality parameter represents a characteristic associated with at least one network component;
identifying a service quality mapping module based on one or more network components associated with providing an end customer service, wherein the service quality mapping module corresponds to at least one service instance and defines a correlation between the set of key quality parameters and a set of customer quality parameters, and wherein the service quality mapping module further comprises:
a set of service quality parameters, wherein at least one service quality parameter is included for each network component involved in providing the end customer service,
a first correlation function defining a correlation between the set of key quality parameters and the set of service quality parameters, and
a second correlation function defining a correlation between the set of service quality parameters and the set of customer quality parameters;
applying the service quality mapping module to the set of key quality parameters to generate the set of customer quality parameters;
outputting a signal representing at least one customer quality parameter included in the set of customer quality parameters;
defining a correlation set corresponding to a customer quality parameter included in the set of customer quality parameters, wherein the correlation set comprises the customer quality parameter and each key quality parameter and service quality parameter correlated with the customer quality parameter;
identifying one or more responsibility pools associated with at least one service quality parameter, key quality parameter, or customer quality parameter included in the correlation set; and
outputting a signal representing the customer quality parameter corresponding to the correlation set to one or more departments associated with the one or more identified responsibility pools.

23. A computer storage medium encoded with a computer program, the program comprising instructions that when executed by data processing apparatus cause the data processing apparatus to perform operations comprising:
receiving a set of key quality parameters, wherein a key quality parameter represents a characteristic associated with at least one network component;
identifying a service quality mapping module based on one or more network components associated with providing an end customer service, wherein the service quality mapping module corresponds to at least one service instance and defines a correlation between the set of key quality parameters and a set of customer quality parameters, and wherein the service quality mapping module further comprises:
a set of service quality parameters, wherein at least one service quality parameter is included for each network component involved in providing the end customer service,
a first correlation function defining a correlation between the set of key quality parameters and the set of service quality parameters, and
a second correlation function defining a correlation between the set of service quality parameters and the set of customer quality parameters;
applying the service quality mapping module to the set of key quality parameters to generate the set of customer quality parameters;
outputting a signal representing at least one customer quality parameter included in the set of customer quality parameters;
retrieving service level agreement data from an end customer database, wherein the service level agreement data includes any combination of one or more predetermined key quality parameters, one or more predetermined service quality parameters, and one or more predetermined customer quality parameters;
determining a deviation between the retrieved service level agreement data and one or more corresponding parameters included in any of the set of key quality parameters, the set of service quality parameters, and the set of customer quality parameters; and
outputting a signal indicating the determined deviation.

24. The computer storage medium of claim 23, wherein the service quality mapping module defines a linear dependency between a customer quality parameter and at least one key quality parameter.

25. The computer storage medium of claim 24, wherein the linear dependency between the customer quality parameter and the at least one key quality parameter includes one or more weighting factors.

26. The computer storage medium of claim 23, wherein at least one of the first correlation function and the second correlation function includes one or more weighting factors.

27. The computer storage medium of claim 23, wherein the operations further comprise outputting the signal to a department responsible for at least one key quality parameter, service quality parameter, or customer quality parameter that deviates from the retrieved service level agreement data.

28. The computer storage medium of claim 23, wherein the set of customer quality parameters indicates at least one aspect of a service quality perceived by an end customer.

29. The computer storage medium of claim 23, wherein the service quality mapping module comprises a plurality of instance quality mapping modules, each instance quality mapping module corresponding to a service instance.

30. The computer storage medium of claim 23, wherein applying the service quality mapping module further comprises:
applying at least one of the plurality of instance quality mapping modules to one or more key quality parameters included in the set of key quality parameters to generate one or more customer quality parameters associated with the corresponding service instance.

31. The computer storage medium of claim 23, wherein receiving the set of key quality parameters further comprises:

receiving one or more trigger signals, wherein a trigger signal represents a characteristic associated with at least one network component; and generating the set of key quality parameters from the one or more received trigger signals.

32. The computer storage medium of claim 31, wherein the set of key quality parameters is generated in accordance with a normalized grading scheme.

33. A computer storage medium encoded with a computer program, the program comprising instructions that when executed by data processing apparatus cause the data processing apparatus to perform operations comprising:

receiving a set of key quality parameters, wherein a key quality parameter represents a characteristic associated with at least one network component;

identifying a service quality mapping module based on one or more network components associated with providing an end customer service, wherein the service quality mapping module corresponds to at least one service instance and defines a correlation between the set of key quality parameters and a set of customer quality parameters, and wherein the service quality mapping module further comprises:

a set of service quality parameters, wherein at least one service quality parameter is included for each network component involved in providing the end customer service, a first correlation function defining a correlation between the set of key quality parameters and the set of service quality parameters, and a second correlation function defining a correlation between the set of service quality parameters and the set of customer quality parameters;

applying the service quality mapping module to the set of key quality parameters to generate the set of customer quality parameters;

outputting a signal representing at least one customer quality parameter included in the set of customer quality parameters;

defining a correlation set corresponding to a customer quality parameter included in the set of customer quality parameters, wherein the correlation set comprises the customer quality parameter and each key quality parameter and service quality parameter correlated with the customer quality parameter;

identifying one or more responsibility pools associated with at least one service quality parameter, key quality parameter, or customer quality parameter included in the correlation set; and outputting a signal representing the customer quality parameter corresponding to the correlation set to one or more departments associated with the one or more identified responsibility pools.

* * * * *

UNITED STATES PATENT AND TRADEMARK OFFICE
CERTIFICATE OF CORRECTION

| | | |
|---|---|---|
| PATENT NO. | : 7,639,630 B2 | Page 1 of 1 |
| APPLICATION NO. | : 11/557078 | |
| DATED | : December 29, 2009 | |
| INVENTOR(S) | : Healy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 458 days.

Signed and Sealed this

Ninth Day of November, 2010

David J. Kappos
*Director of the United States Patent and Trademark Office*